United States Patent
Zhao et al.

(10) Patent No.: US 9,294,409 B2
(45) Date of Patent: Mar. 22, 2016

(54) REDUCING ROUND-TRIP TIMES FOR TCP COMMUNICATIONS

(71) Applicant: Apple Inc., Cupertino, CA (US)

(72) Inventors: Wen Zhao, Cupertino, CA (US); Wenping Lou, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 191 days.

(21) Appl. No.: 13/747,287

(22) Filed: Jan. 22, 2013

(65) Prior Publication Data

US 2014/0204737 A1    Jul. 24, 2014

(51) Int. Cl.
*H04L 12/28* (2006.01)
*H04J 3/24* (2006.01)
*H04L 12/801* (2013.01)

(52) U.S. Cl.
CPC .................................. *H04L 47/193* (2013.01)

(58) Field of Classification Search
USPC ................................... 370/230, 255, 235, 229
See application file for complete search history.

(56) References Cited

U.S. PATENT DOCUMENTS

| 6,341,129 | B1* | 1/2002 | Schroeder et al. | 370/354 |
| 6,894,974 | B1* | 5/2005 | Aweva et al. | 370/230.1 |
| 6,976,205 | B1* | 12/2005 | Ziai et al. | 714/807 |
| 7,965,674 | B2* | 6/2011 | Sengupta et al. | 370/328 |
| 2002/0167948 | A1* | 11/2002 | Chen | 370/392 |
| 2012/0005369 | A1* | 1/2012 | Capone et al. | 709/236 |

* cited by examiner

*Primary Examiner* — Edan Orgad
*Assistant Examiner* — Sithu Ko
(74) *Attorney, Agent, or Firm* — Sterne, Kessler, Goldstein & Fox P.L.L.C.

(57) ABSTRACT

The disclosed embodiments provide a system that processes network packets. Upon receiving a first Transmission Control Protocol (TCP) header for a first TCP segment from a network link, the system immediately provides a portion of the first TCP header to a transport layer prior to receiving all payload data for the first TCP segment. Next, the system uses the transport layer to transmit a first acknowledgment of the first TCP segment to the network link, wherein the first acknowledgment reduces a round-trip time (RTT) associated with the first TCP segment.

22 Claims, 5 Drawing Sheets

REDUCING ROUND-TRIP TIMES FOR TCP COMMUNICATIONS

BACKGROUND

1. Field

The disclosed embodiments relate to Transmission Control Protocol (TCP) communications. More specifically, the disclosed embodiments relate to technique for reducing round-trip times (RTTs) for TCP communications.

2. Related Art

Network links such as wireless access points, cell towers, and/or routers may be shared by a number of network-enabled electronic devices such as personal computers, laptop computers, mobile phones, tablet computers, portable media players, digital media receivers, printers, and/or video game consoles. To manage network traffic to the electronic devices, the network links may reduce the flow of packets to the electronic devices, reorder the packets, and/or drop the packets. Senders of the packets may also adjust the rate of transmission of subsequent packets based on packet errors, losses, and/or delays, thus lifting congestion at the network links and facilitating sharing of the network bandwidth by the electronic devices.

On the other hand, the electronic devices may lack the ability to influence the transmission of packets from the senders. Instead, the electronic devices may only receive the packets at the rate at which the packets are transmitted by the senders and/or network links. Moreover, the use of Transmission Control Protocol (TCP) to transmit data from a sender to an electronic device may require the acknowledgment of each TCP segment received by the electronic device before the sender transmits another TCP segment to the electronic device. Such fluctuations in the throughput of network links between the sender and the electronic device, combined with the overhead and/or delay associated with acknowledgment of TCP segments, may cause the electronic device to experience increased latency on the network and, in turn, reduced performance. Consequently, network-based data transmission may be improved by managing and/or expediting TCP communications among network-enabled devices.

SUMMARY

The disclosed embodiments provide a system that processes network packets. Upon receiving a first Transmission Control Protocol (TCP) header for a first TCP segment from a network link, the system immediately provides a portion of the first TCP header to a transport layer prior to receiving all payload data for the first TCP segment. Next, the system uses the transport layer to transmit a first acknowledgment of the first TCP segment to the network link, wherein the first acknowledgment reduces a round-trip time (RTT) associated with the first TCP segment.

In some embodiments, upon receiving all payload data for the first TCP segment, the system also provides the first TCP segment comprising the first TCP header and the received payload data to the transport layer. Next, the system omits a second acknowledgment of the first TCP segment from the transport layer.

In some embodiments, the system also verifies a checksum for the first TCP segment prior to providing the first TCP segment to the transport layer.

In some embodiments, verifying the checksum for the first TCP segment involves providing the first TCP segment to the transport layer if the checksum is valid, and discarding the TCP segment if the checksum is invalid.

In some embodiments, upon receiving a second TCP header for a second acknowledgment of a second TCP segment transmitted to the network link, the system also immediately provides the second TCP header to the transport layer, and uses the transport layer to transmit a third TCP segment to the network link.

In some embodiments, the portion of the first TCP header includes an acknowledgment bit, an acknowledgment number, a push bit, and a window size.

In some embodiments, the network link is associated with a cellular network.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
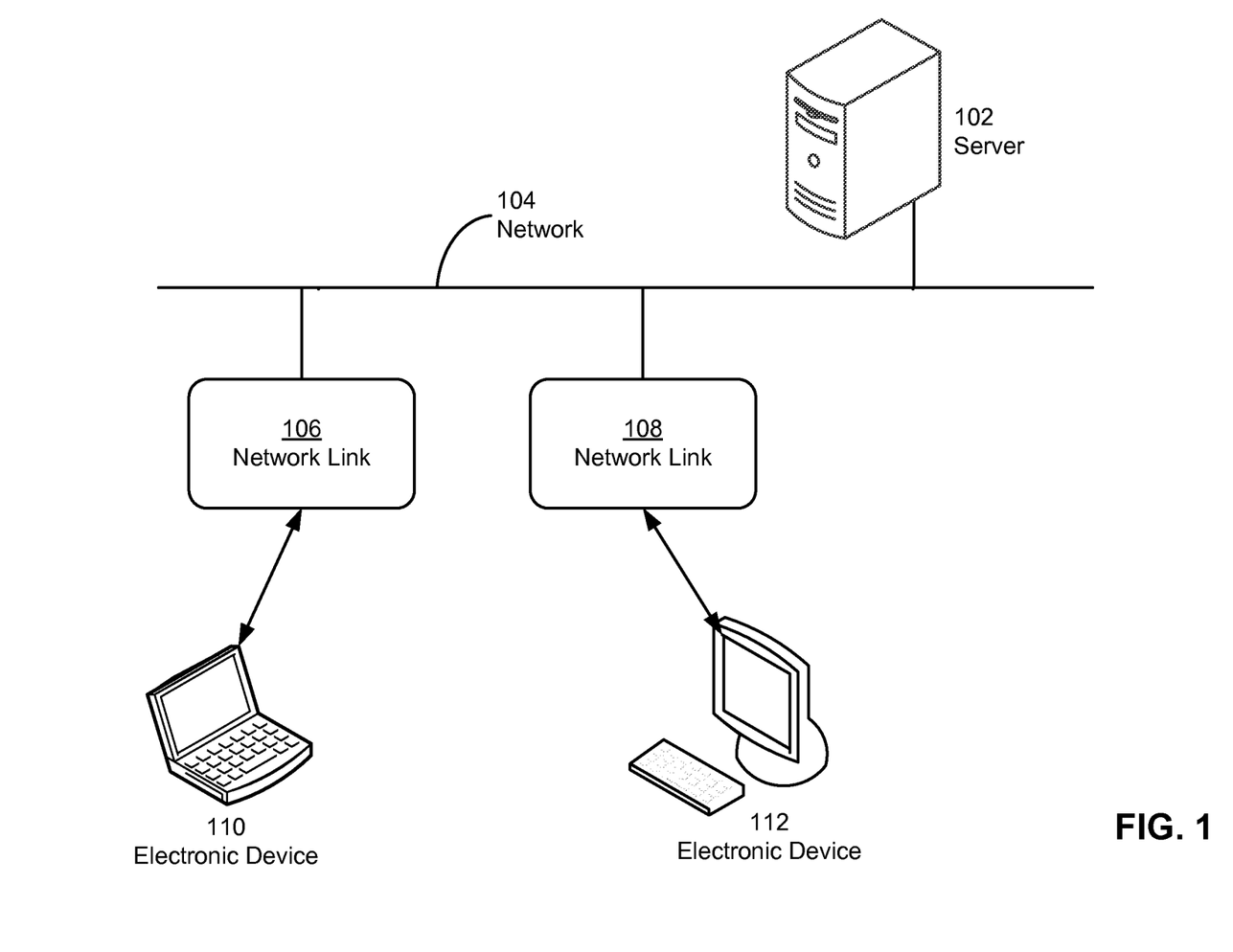
FIG. 1 shows a schematic of a system in accordance with the disclosed embodiments.

The disclosed embodiments provide a method and system for processing network packets. As shown in FIG. 1, a number of electronic devices 110-112 are connected to a network 104 through network links 106-108 provided by devices such as wireless access points, cellular towers, and/or routers. Electronic devices 110-112 may correspond to personal computers, laptop computers, tablet computers, mobile phones, portable media players, and/or other network-enabled electronic devices. Network 104 may include a local area network (LAN), wide area network (WAN), personal area network (PAN), virtual private network, intranet, mobile phone network (e.g., a cellular network), WiFi network, Bluetooth network, universal serial bus (USB) network, Ethernet network, an ad hoc network formed between two or more devices, and/or other type of network that facilitates communication among electronic devices (e.g., electronic devices 110-112) connected to network 104.

In particular, electronic devices 110-112 may interact with one another and/or a server 102 on network 104 by sending and receiving data such as files, audio, video, and/or web content over network 104. For example, electronic device 110 may request data from electronic device 112 and server 102 by establishing Transmission Control Protocol (TCP) connections with electronic device 112 and server 102. Electronic device 112 and server 102 may provide the requested data by transmitting a sequence of packets (e.g., TCP segments) containing the data over network 104 to electronic device 110. At the same time, electronic devices 110-112 and/or other electronic devices (not shown) may communicate with one another, server 102, and/or other servers (not shown) on network 104 by transmitting and receiving packets over network 104.

To prevent and/or mitigate congestion on network, network links 106-108 and/or other network links (not shown) on network 106 may implement network traffic control techniques that queue, reorder, delay, and/or drop packets to electronic devices 110-112 and/or the other computer systems. Electronic devices 110-112, server 102, and/or other senders of packets may also adjust the rate of transmission of subsequent packets based on packet errors, losses, and/or delays, thus facilitating sharing of available bandwidth and/or effective use of network 104 by electronic devices 110-112.

However, conventional electronic devices (e.g., smart phones, desktops computers, tablet computers, etc.) may lack the ability to control the receipt of packets from one another and/or servers on network 104. In addition, TCP communications among the electronic devices and/or servers may require the acknowledgment of every TCP segment received from a sender of the TCP segment before the transmission of another TCP segment from the sender. The combination of fluctuating bandwidth at network links between the sender and receiver of data over network 104 and the delay associated with acknowledgment of individual TCP segments may increase the round-trip times (RTTs) of the TCP segments, thereby reducing throughput and/or performance for the sender and/or receiver.

Figure 2:
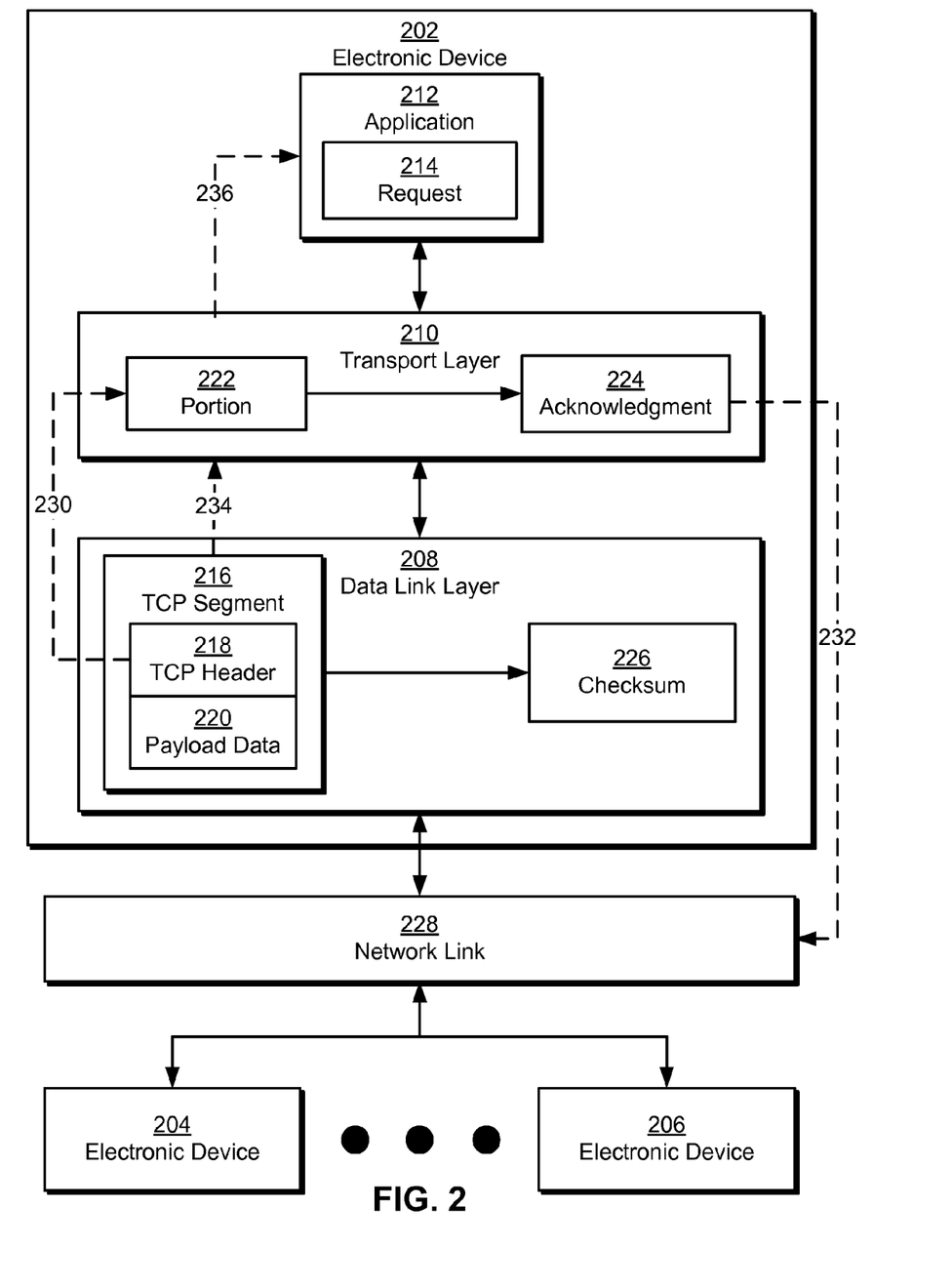
FIG. 2 shows a system for processing network packets in accordance with the disclosed embodiments.

In one or more embodiments, electronic devices 110-112 and/or server 102 include functionality to increase throughput and reduce RTTs for TCP communications. As shown in FIG. 2, a set of electronic devices 202-206 (e.g., personal computers, laptop computers, mobile phones, tablet computers, portable media players, servers, etc.) may be connected to one another through a network such as network 104 of FIG. 1.

To communicate, electronic devices 202-206 may transmit packets among one another through a network link 228 of the network.

More specifically, an application 212 on electronic device 202 may make a request 214 for data on one or more other electronic devices 204-206. For example, application 212 may be a web browser that transmits a HyperText Transfer Protocol (HTTP) request 214 for a web page and/or other content over network link 228 to a web server. In response to the HTTP request, the web server may transmit packets containing the requested data through network link 228 to electronic device 202.

The data may then be processed by one or more layers of a network stack on electronic device 202 before the data is used by application 212. For example, packets from a network link 228 of a cellular network (e.g., a cellular tower) may initially be processed by a data link layer 208 using Radio Link Control (RLC) and/or Radio Link Protocol (RLP). The packets may then be passed to a transport layer 210, which obtains the data from the packets and delivers the data to application 212 for subsequent processing and/or display on electronic device 202.

As mentioned above, data associated with request 214 may be transmitted using TCP. Consequently, the data may be delivered to electronic device 202 as a TCP segment 216 from the sender of the data and/or network link 228. To reduce the RTT associated with TCP segment 216, data link layer 208 may make a transmission 230 of a portion 222 of a TCP header 218 for TCP segment 216 to transport layer 210 immediately after receiving TCP header 218 from network link 228. Because transport layer 210 receives portion 222 before all payload data 220 for TCP segment 216 is received from network link 228, portion 222 may include elements of TCP header 218 that are independent of payload data 220. For example, portion 222 may include an acknowledgment bit, an acknowledgment number, a push bit, and/or a window size for TCP segment 216.

Next, transport layer 210 may generate an acknowledgment 224 of TCP segment 216 using portion 222 and make a transmission 232 of acknowledgment 224 to network link 228 for forwarding to the sender of TCP segment 216. Such transmission of acknowledgment 224 before the entirety of TCP segment 216 is received may enable faster receipt of a subsequent TCP segment from the sender than if acknowledgment 224 were transmitted based on conventional TCP-processing mechanisms (e.g., after all payload data 220 is received and verified).

After data link layer 208 receives all payload data 220 for TCP segment 216 from network link 228, data link layer 208 may make a transmission 234 of the entirety of TCP segment 216, which includes both TCP header 218 and payload data 220, to transport layer 210. Because acknowledgment 224 was previously transmitted by transport layer 210 to network link 228, transport layer 210 may omit a second acknowledgment of TCP segment 216 after receiving TCP segment 216 from data link layer 208.

Prior to providing TCP segment 216 to transport layer 210, data link layer 208 may verify a checksum 226 for TCP segment 216. For example, data link layer 208 may compute checksum 226 over a pseudo-header for TCP segment 216 and TCP segment 216 and compare the computed checksum 226 with a value for checksum 226 from a checksum field in TCP segment 216. If checksum 226 is valid (e.g., the two values for checksum 226 match), data link layer 208 may provide TCP segment 216 to transport layer 210. If checksum 226 is invalid (e.g., the two values for checksum 226 differ), data link layer 208 may discard TCP segment 216.

In turn, mismatches in values for checksum 226 and/or other errors associated with transmission of TCP segment 216 may be handled by application 212. For example, application 212 may retransmit request 214 if payload data 220 from TCP segment 216 and/or other TCP segments associated with request 214 is not received within a pre-specified period.

By reducing RTTs associated with TCP segment 216 and/or other TCP segments received over network link 228, data link layer 208 and transport layer 210 may increase the throughput of TCP transmission and reduce power consumption associated with receiving and/or processing the TCP segments. For example, the accelerated transmission of TCP acknowledgments from electronic device 202 to the sender of the TCP segments may double the transmission rate of TCP segments from the sender to electronic device 202. The higher transmission rate may halve the transmission time of all TCP segments containing data associated with request 214, thus reducing the power consumption of a radio and/or other hardware used to receive the TCP segments on electronic device 202.

Figure 3:
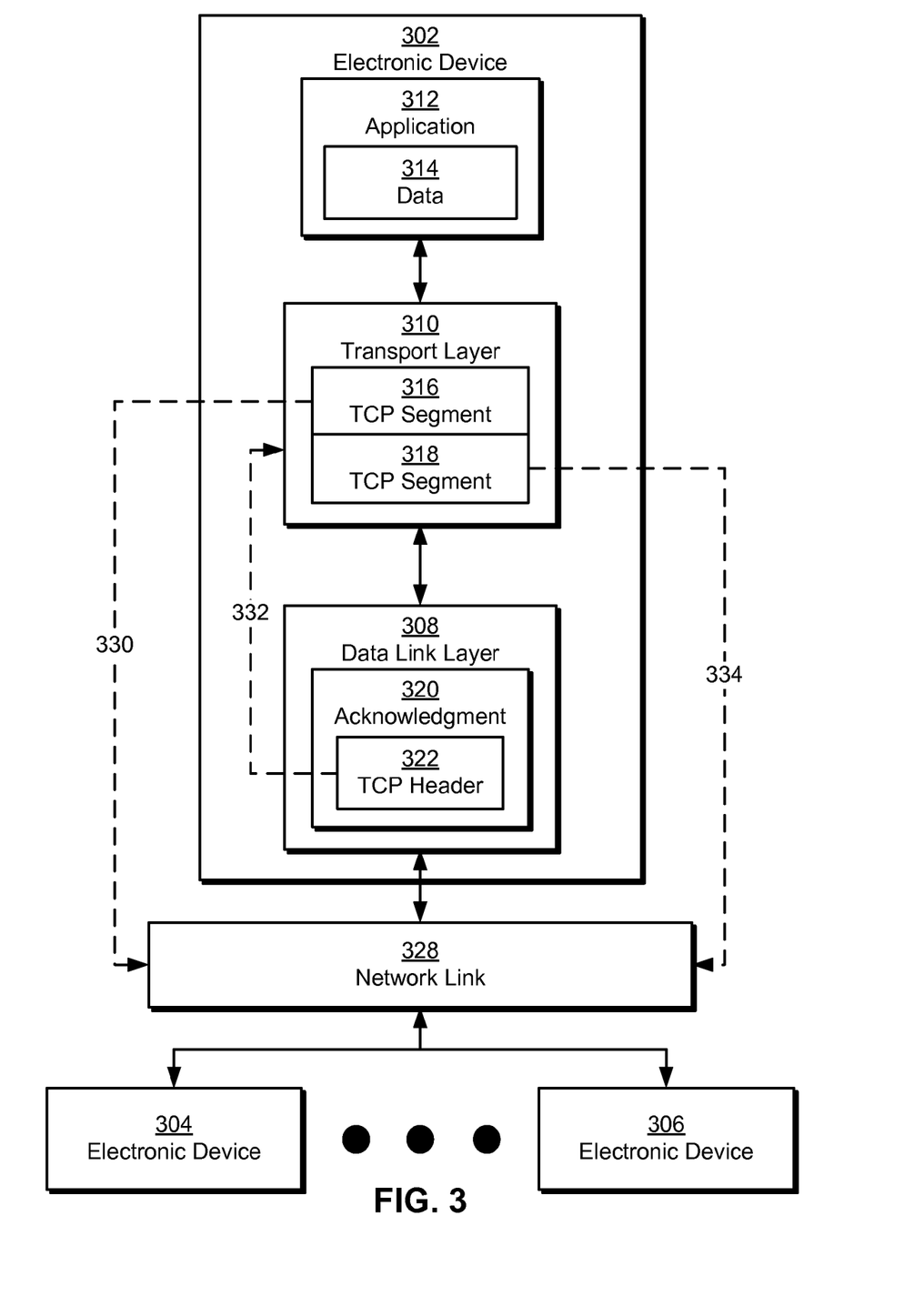
FIG. 3 shows a system for processing network packets in accordance with the disclosed embodiments.

Such reduction of RTTs and/or increases in TCP throughput may also be applied at the sender of the TCP segments. As shown in FIG. 3, an application 312 on an electronic device 302 may include data 314 that is requested by one or more other electronic devices 304-306. For example, electronic device 302 may be a server that serves web pages and/or other content to electronic devices 304-306. Alternatively, electronic device 302 may be a personal computer, laptop computer, tablet computer, mobile phone, and/or other consumer electronic device that includes one or more files to be shared with other electronic devices 304-306 using a file-sharing application 312.

To provide data 314 to the other electronic devices 304-306, a transport layer 310 on electronic device 302 may package data 314 into a set of TCP segments 316-318 that are transmitted over a network link 328 to electronic devices 304-306. In addition, each TCP segment may not be transmitted until an acknowledgment (e.g., acknowledgment 320) for the preceding TCP segment is received over network link 328.

In one or more embodiments, electronic device 302 includes functionality to increase the throughput associated with transmission of TCP segments 316-318. First, transport layer 310 may make a transmission 330 of a first TCP segment 316 to network link 328 for forwarding of TCP segment 316 to a receiver of data 314. A data link layer 308 in electronic device 302 may subsequently receive a TCP header 322 for an acknowledgment 320 of TCP segment 316 from the receiver and immediately make a transmission 332 of TCP header 322 to transport layer 310, with or without the rest of acknowledgment 320. Transport layer 310 may then make a transmission 334 of the next TCP segment 318 to network link 328 for forwarding to the receiver. In other words, electronic device 302 may expedite transmission of TCP segments 316-318 to the receiver by transmitting each TCP segment as soon as enough information to confirm acknowledgment (e.g., acknowledgment 320) of the previous TCP segment is received.

Figure 4:
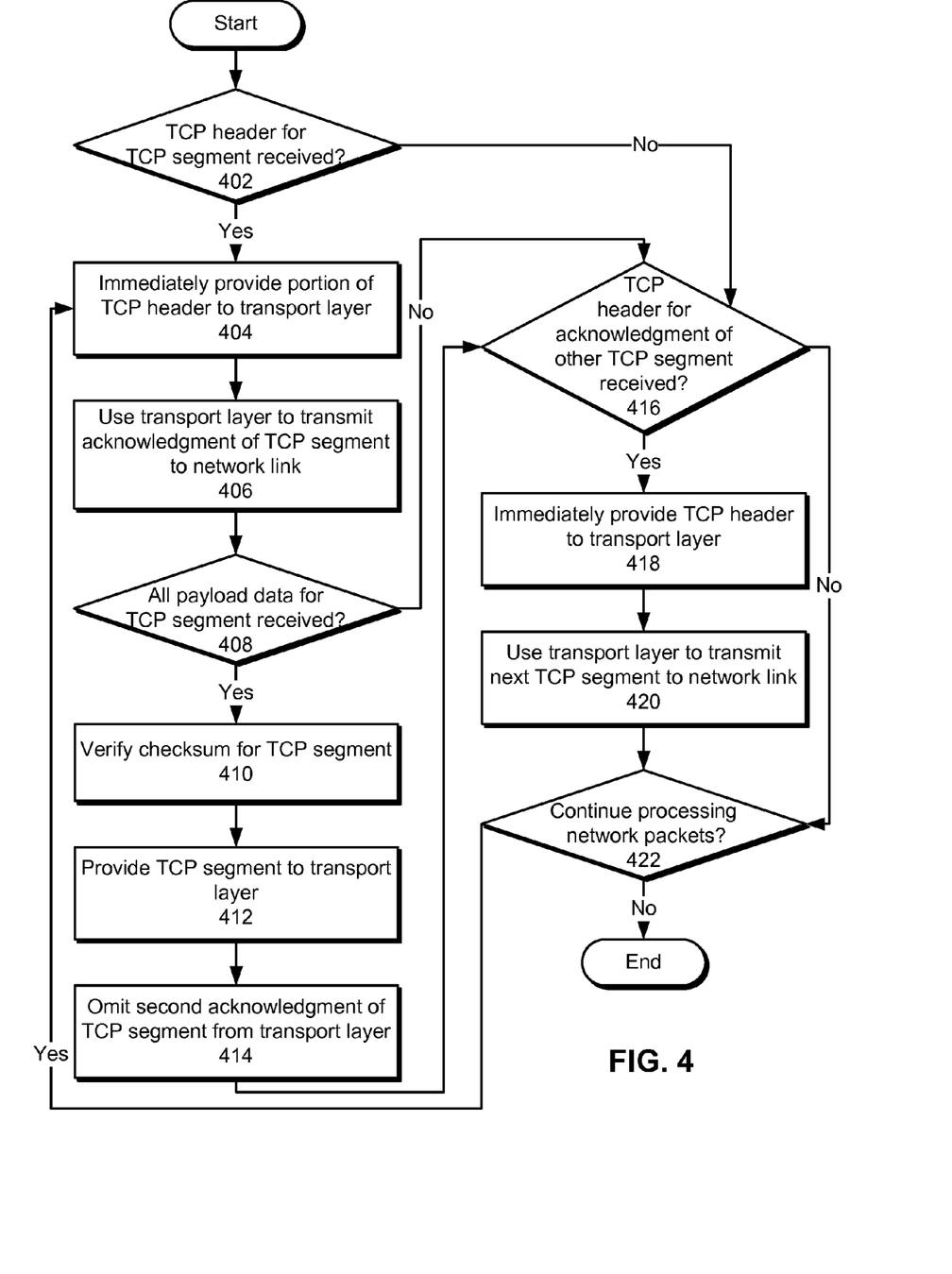
FIG. 4 shows a flowchart illustrating the process of processing network packets in accordance with the disclosed embodiments.

FIG. 4 shows a flowchart illustrating the process of processing network packets in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

Initially, a TCP header for a TCP segment may be received (operation 402) from a network link. The network link may be associated with a cellular network. For example, the TCP segment may be received over the network link by a mobile phone, tablet computer, and/or other electronic device that utilizes cellular networks to send and receive TCP communications.

In addition, receipt of the TCP header may be based on the transmission of a request for data from an application to a sender of the TCP segment, such as a server and/or electronic device. If no TCP header is received, no request for data may be made by the application, and no processing related to the TCP segment is performed.

If a TCP header is received (e.g., after a request for data is made by the application), a portion of the TCP header is immediately provided to a transport layer (operation 404). The portion of the TCP header may include an acknowledgment bit, an acknowledgment number, a push bit, a window size, and/or other information that is independent of payload data for the TCP segment. The TCP header may also be provided to the transport layer prior to receiving all payload data for the TCP segment. In turn, the transport layer is used to transmit an acknowledgment of the TCP segment to the network link (operation 406), which may reduce an RTT associated with the TCP segment. For example, the acknowledgment may be transmitted without obtaining and processing the payload data prior to conventional transmission of TCP acknowledgments, thus reducing the delay between receipt of the TCP segment and receipt of the next TCP segment from a sender of the TCP segments.

All payload data for the TCP segment may subsequently be received (operation 408) after the acknowledgment is transmitted. If all of the payload data has not yet been received, no further processing of the TCP segment is made. Once all of the payload data is received, a checksum for the TCP segment is verified (operation 410). For example, the checksum may be verified by computing the checksum over a pseudo-header and the TCP segment and comparing the computed checksum with a value for the checksum from the TCP header. During verification of the checksum, the TCP segment may be provided to the transport layer (operation 412) if the checksum is valid and discarded if the checksum is invalid. If the TCP segment is discarded and/or other errors associated with the receipt of TCP segments occur, the application may handle the errors by sending the same request for data to the sender of the TCP segments.

A second acknowledgment of the TCP segment may be omitted from the transport layer (operation 414) after the TCP segment is provided to the transport layer. For example, the transport layer may identify the TCP header for the TCP segment as a duplicate of the TCP header received in operation 402 and process the TCP segment without transmitting another acknowledgment for the TCP segment to the network link and/or sender.

A TCP header for an acknowledgment of another TCP segment may also be received (operation 416) independently of the receipt of TCP segments from the network link. For example, the TCP segment in operations 402-414 may be received over the network link from the sender, while the acknowledgment of operation 416 may be for transmission of the other TCP segment over the network link to a receiver of the other TCP segment. If the acknowledgment of the other TCP segment is received, the TCP header is provided immediately to the transport layer (operation 418), and the transport layer is used to transmit the next TCP segment following the other TCP segment to the network link (operation 420). If no TCP header for the acknowledgment is received, no processing related to the acknowledgment and/or the next TCP segment is performed.

Processing of network packets (operation 422) may continue during transmission and/or receipt of TCP segments and/or acknowledgments. If processing of network packets is to continue, transmission of acknowledgments of TCP segments to the network link is accelerated (operations 402-406), and the entire TCP segments are subsequently provided (operations 410-412) without transmitting duplicate acknowledgments for the TCP segments (operation 414) to the network link and/or sender. Acknowledgments of TCP segments transmitted over the network links may also be processed in an expedited manner (operations 416-420) to facilitate transmission of TCP segments over the network link to a receiver of the TCP segments. Such processing of network packets may thus continue until TCP segments are no longer transmitted or received.

Figure 5:
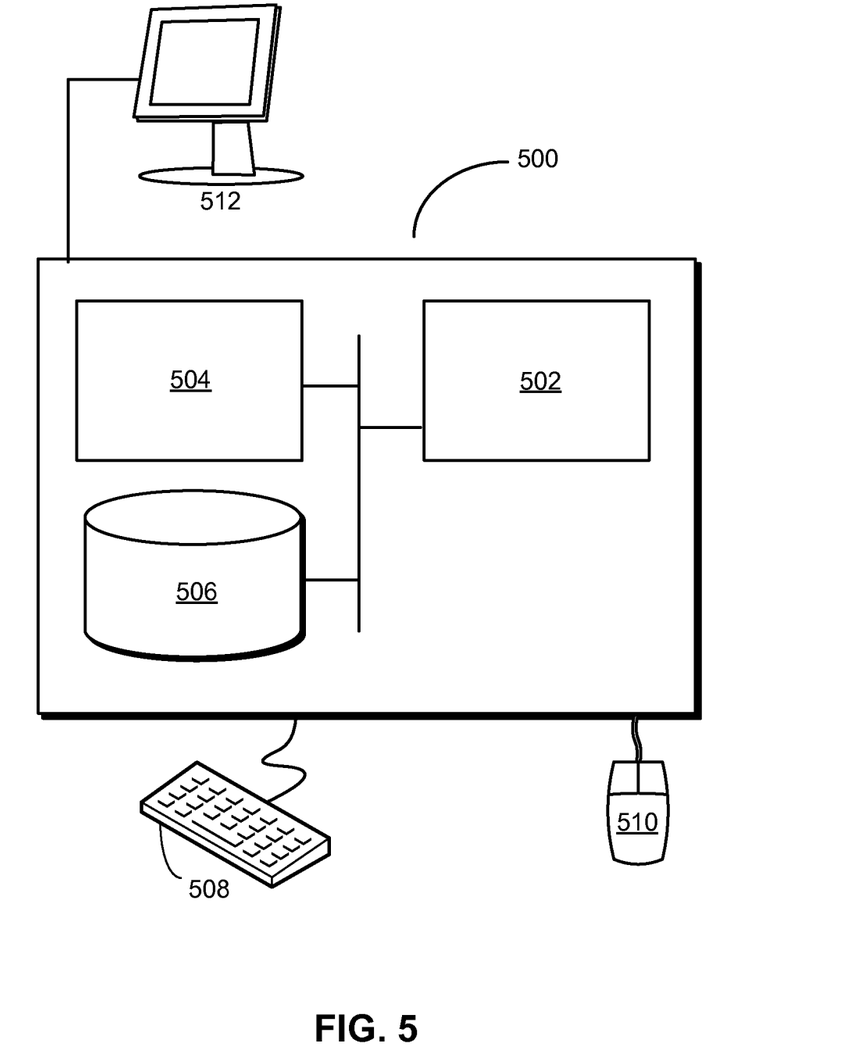
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing network packets. The system may include a data link layer and a transport layer. Upon receiving a first Transmission Control Protocol (TCP) header for a first TCP segment from a network link, the data link layer may immediately provide a portion of the first TCP header to the transport layer prior to receiving all payload data for the first TCP segment. Next, the transport layer may reduce a RTT associated with the first TCP segment by transmitting a first acknowledgment of the first TCP segment to the network link. Upon receiving all payload data for the first TCP segment, the data link layer may verify a checksum for the first TCP segment and provide the first TCP segment to the transport layer, and the transport layer may omit a second acknowledgment of the first TCP segment.

The system may also reduce RTTs for TCP segments transmitted to the network link. More specifically, upon receiving a second TCP header for a second acknowledgment of a second TCP segment transmitted to the network link, the data link layer may immediately provide the second TCP header to the transport layer, and the transport layer may transmit a third TCP segment to the network link.

In addition, one or more components of computer system 500 may be remotely located and connected to the other components over a network. Portions of the present embodiments (e.g., data link layer, transport layer, etc.) may also be located on different nodes of a distributed system that implements the embodiments. For example, the present embodiments may be implemented using a remote packet-processing system that reduces RTTs associated with TCP segments transmitted among a set of remote electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for processing network packets, comprising:
    upon receiving a first Transmission Control Protocol (TCP) header for a first TCP segment from a network link, immediately providing a portion of the first TCP header to a transport layer prior to receiving all payload data for the first TCP segment, the first TCP segment included within a single packet;
    using the transport layer to transmit a first acknowledgment of the first TCP segment to the network link, wherein the first acknowledgment reduces a round-trip time (RTT) associated with the first TCP segment; and
    upon receiving payload data for the first TCP segment, providing the received payload data to the transport layer.

2. The computer-implemented method of claim 1, wherein providing the received payload data further comprises:
    upon receiving all payload data for the first TCP segment, providing the first TCP segment comprising the first TCP header and the received payload data to the transport layer; and
    omitting a second acknowledgment of the first TCP segment from the transport layer.

3. The computer-implemented method of claim 2, further comprising:
    verifying a checksum for the first TCP segment prior to providing the first TCP segment to the transport layer.

4. The computer-implemented method of claim 3, wherein verifying the checksum for the first TCP segment involves:
    if the checksum is valid, providing the first TCP segment to the transport layer; and
    if the checksum is invalid, discarding the TCP segment.

5. The computer-implemented method of claim 1, further comprising:
    upon receiving a second TCP header for a second acknowledgment of a second TCP segment transmitted to the network link, immediately providing the second TCP header to the transport layer; and
    using the transport layer to transmit a third TCP segment to the network link.

6. The computer-implemented method of claim 1, wherein the portion of the first TCP header comprises:
    an acknowledgment bit;
    an acknowledgment number;
    a push bit; and
    a window size.

7. The computer-implemented method of claim 1, wherein the network link is associated with a cellular network.

8. A system for processing network packets, comprising:
    a data link layer, wherein upon receiving a first Transmission Control Protocol (TCP) header for a first TCP segment from a network link, the data link layer is configured to immediately provide a portion of the first TCP header to a transport layer prior to receiving all payload data for the first TCP segment, the first TCP segment included within a single packet;
    the transport layer configured to transmit a first acknowledgment of the first TCP segment to the network link, wherein the first acknowledgment reduces a round-trip time (RTT) associated with the first TCP segment; and the data link layer, upon receiving payload data for the first TCP segment, providing the received payload data to the transport layer.

9. The system of claim 8, wherein providing the received payload data further comprises:

upon receiving all payload data for the first TCP segment, the data link layer is further configured to provide the first TCP segment comprising the first TCP header and the received payload data to the transport layer, and wherein the transport layer is further configured to omit a second acknowledgment of the first TCP segment.

10. The system of claim 9, wherein the data link layer is further configured to:

verify a checksum for the first TCP segment prior to providing the first TCP segment to the transport layer.

11. The system of claim 10, wherein verifying the checksum for the first TCP segment involves:

if the checksum is valid, providing the first TCP segment to the transport layer; and if the checksum is invalid, discarding the TCP segment.

12. The system of claim 8, wherein upon receiving a second TCP header for a second acknowledgment of a second TCP segment transmitted to the network link, the data link layer is configured to immediately provide the second TCP header to the transport layer, and wherein the transport layer is further configured to transmit a third TCP segment to the network link.

13. The system of claim 8, wherein the portion of the first TCP header comprises:

an acknowledgment bit;
an acknowledgment number;
a push bit; and
a window size.

14. The system of claim 8, wherein the network link is associated with a cellular network.

15. A non-transitory computer-readable storage medium storing instructions that when executed by a computer cause the computer to perform a method for processing network packets, the method comprising:

upon receiving a first Transmission Control Protocol (TCP) header for a first TCP segment from a network link, immediately providing a portion of the first TCP header to a transport layer prior to receiving all payload data for the first TCP segment, the first TCP segment included within a single packet;

using the transport layer to transmit a first acknowledgment of the first TCP segment to the network link, wherein the first acknowledgment reduces a round-trip time (RTT) associated with the first TCP segment; and upon receiving payload data for the first TCP segment, providing the received payload data to the transport layer.

16. The computer-readable storage medium of claim 15, wherein providing the received payload data further comprises:

upon receiving all payload data for the first TCP segment, providing the first TCP segment comprising the first TCP header and the received payload data to the transport layer; and omitting a second acknowledgment of the first TCP segment from the transport layer.

17. The computer-readable storage medium of claim 16, the method further comprising:

verifying a checksum for the first TCP segment prior to providing the first TCP segment to the transport layer.

18. The computer-readable storage medium of claim 17, wherein verifying the checksum for the first TCP segment involves:

if the checksum is valid, providing the first TCP segment to the transport layer; and if the checksum is invalid, discarding the TCP segment.

19. The computer-readable storage medium of claim 15, the method further comprising:

upon receiving a second TCP header for a second acknowledgment of a second TCP segment transmitted to the network link, immediately providing the second TCP header to the transport layer; and using the transport layer to transmit a third TCP segment to the network link.

20. The computer-readable storage medium of claim 15, wherein the portion of the first TCP header comprises:

an acknowledgment bit;
an acknowledgment number;
a push bit; and
a window size.

21. The computer-readable storage medium of claim 15, wherein the network link is associated with a cellular network.

22. The computer-implemented method of claim 1, further comprising:

generating, in the transport layer, the first acknowledgement of the first TCP segment based on the portion of the first TCP header prior to receiving all payload data for the first TCP segment.

* * * * *